US012799264B2

(12) United States Patent
Takada et al.

(10) Patent No.: US 12,799,264 B2
(45) Date of Patent: Nov. 17, 2026

(54) TWO-COMPONENT-CURABLE POLYURETHANE RESIN COMPOSITION

(71) Applicant: DKS Co. Ltd., Kyoto (JP)

(72) Inventors: Kazuhito Takada, Kyoto (JP); Azusa Kanai, Kyoto (JP)

(73) Assignee: DKS CO. LTD., Kyoto (JP)

( * ) Notice: Subject to any disclaimer, the term of this patent is extended or adjusted under 35 U.S.C. 154(b) by 451 days.

(21) Appl. No.: 18/278,493

(22) PCT Filed: Feb. 16, 2022

(86) PCT No.: PCT/JP2022/006072
§ 371 (c)(1),
(2) Date: Aug. 23, 2023

(87) PCT Pub. No.: WO2022/185910
PCT Pub. Date: Sep. 9, 2022

(65) Prior Publication Data

US 2024/0052088 A1 Feb. 15, 2024

(30) Foreign Application Priority Data

Mar. 5, 2021 (JP) ................................ 2021-035798

(51) Int. Cl.

| | |
|---|---|
| ***C08G 18/69*** | (2006.01) |
| ***C08G 18/28*** | (2006.01) |
| ***C08G 18/62*** | (2006.01) |
| ***C08G 18/76*** | (2006.01) |
| ***C09J 175/08*** | (2006.01) |
| ***C09J 175/14*** | (2006.01) |

(52) U.S. Cl.
CPC ......... *C08G 18/698* (2013.01); *C08G 18/282* (2013.01); *C08G 18/6245* (2013.01); *C08G 18/69* (2013.01); *C08G 18/7685* (2013.01); *C09J 175/08* (2013.01); *C09J 175/14* (2013.01)

(58) Field of Classification Search
CPC ... C08G 18/6245; C08G 18/69; C08G 18/282
See application file for complete search history.

(56) References Cited

U.S. PATENT DOCUMENTS

| | | | | | |
|---|---|---|---|---|---|
| 4,355,130 | A * | 10/1982 | Heinze | C08K 5/12 264/272.13 |
| 6,121,354 | A * | 9/2000 | Chronister | C08G 18/12 524/505 |
| 2014/0248497 | A1* | 9/2014 | Takei | C08G 18/792 528/65 |
| 2017/0260434 | A1* | 9/2017 | Matsuki | C08G 18/792 |
| 2018/0163103 | A1* | 6/2018 | Abe | C08G 18/632 |
| 2021/0253920 | A1* | 8/2021 | Matsuki | C08G 18/724 |
| 2022/0002599 | A1* | 1/2022 | Abe | C09J 175/14 |
| 2022/0041908 | A1* | 2/2022 | Abe | C08G 18/2081 |
| 2022/0089922 | A1* | 3/2022 | Narutaki | C08G 18/4812 |
| 2024/0052088 | A1* | 2/2024 | Takada | C08G 18/7664 |

FOREIGN PATENT DOCUMENTS

| | | | |
|---|---|---|---|
| EP | 764707 | A2 * | 3/1997 |
| JP | 61-197620 | A | 9/1986 |
| JP | 8-165454 | A | 6/1996 |
| JP | 2006199889 | A * | 8/2006 |

OTHER PUBLICATIONS

JP-2006199889-A_2006-08-03_English Translation.*
English translation of the International Search Report for International Application No. PCT/JP2022/006072, dated Mar. 29, 2022.
International Preliminary Report on Patentability and English translation of the Written Opinion of the International Searching Authority for International Application No. PCT/JP2022/006072, dated Aug. 29, 2023.

* cited by examiner

*Primary Examiner* — Michael L Leonard
(74) *Attorney, Agent, or Firm* — Birch, Stewart, Kolasch & Birch, LLP

(57) ABSTRACT

Provided is a two-component-curable polyurethane resin composition that has high compatibility, high adhesion, and a good low-dielectric-constant characteristic.
A two-component-curable polyurethane resin composition according to an embodiment includes a first component including a polyol and a terpene resin, and a second component including a polyisocyanate, wherein the polyol includes 30 mass % or more of a polybutadiene polyol and/or a hydrogenated polybutadiene polyol, and a content of the terpene resin relative to 100 parts by mass of the polyol is 1 to 60 parts by mass.

5 Claims, No Drawings

TWO-COMPONENT-CURABLE POLYURETHANE RESIN COMPOSITION

TECHNICAL FIELD

The present invention relates to a two-component-curable polyurethane resin composition, an electrical or electronic component including the two-component-curable polyurethane resin composition, and a polyol composition used for the two-component-curable polyurethane resin composition.

BACKGROUND ART

Electronic circuit boards and electronic components have been sealed using polyurethane resin compositions in order to protect them from external factors; as the polyols of the polyurethane resin compositions, polybutadiene polyols are known to be used.

For example, Patent Literature 1 discloses an electrically insulating material composed of a hydroxyl group-containing liquid diene-based polymer, a polyisocyanate compound, a polycyclic aromatic hydrocarbon, and a petroleum resin. Patent Literature 2 discloses a heat-resistant damp-proof insulating coating material containing a polymer provided by a reaction among a hydroxyl group-containing polybutadiene, a hydroxyl group-containing hydrogenated polybutadiene, and a polyisocyanate, a tackifier, and a solvent.

CITATION LIST

Patent Literature

PTL 1: Japanese Unexamined Patent Application Publication No. 61-197620

PTL 2: Japanese Unexamined Patent Application Publication No. 8-165454

SUMMARY OF INVENTION

Technical Problem

However, for existing polyurethane resin compositions, in the case of two-component-curable polyurethane resin compositions composed of a first component including a polyol and a second component including a polyisocyanate, the first component containing the polyol and other components such as a petroleum resin may have poor compatibility and adhesion between such a polyurethane resin composition and a substrate may be insufficient. When polyurethane resin compositions are used as, for example, sealing materials for sensors or radio communication components, the polyurethane resin compositions desirably have low dielectric constants in order to suppress influences on radio waves.

Under such circumstances, an object of an embodiment according to the present invention is to provide a two-component-curable polyurethane resin composition that has high compatibility, high adhesion, and a good low-dielectric-constant characteristic.

Solution to Problem

The present invention includes the following embodiments.

[1] A two-component-curable polyurethane resin composition including a first component including a polyol and a terpene resin; and a second component including a polyisocyanate, wherein the polyol includes 30 mass % or more of a polybutadiene polyol and/or a hydrogenated polybutadiene polyol, and a content of the terpene resin relative to 100 parts by mass of the polyol is 1 to 60 parts by mass.

[2] The two-component-curable polyurethane resin composition according to [1], wherein the terpene resin is at least one selected from the group consisting of a polyterpene resin, an aromatic-modified terpene resin, and a terpene phenolic resin.

[3] The two-component-curable polyurethane resin composition according to [1] or [2], wherein the polyol further includes a castor oil-based polyol.

[4] The two-component-curable polyurethane resin composition according to any one of [1] to [3], being used for sealing an electrical or electronic component.

[5] An electrical or electronic component being resin-sealed using the two-component-curable polyurethane resin composition according to any one of [1] to [4].

[6] A polyol composition used as a polyol component of a two-component-curable polyurethane resin composition, the polyol composition including a polyol and a terpene resin, wherein the polyol includes 30 mass % or more of a polybutadiene polyol and/or a hydrogenated polybutadiene polyol, and a content of the terpene resin relative to 100 parts by mass of the polyol is 1 to 60 parts by mass.

Advantageous Effects of Invention

An embodiment according to the present invention can provide a two-component-curable polyurethane resin composition that has high compatibility, high adhesion, and a good low-dielectric-constant characteristic.

DESCRIPTION OF EMBODIMENTS

A two-component-curable polyurethane resin composition according to this embodiment is a polyurethane resin composition including a first component including a polyol (A) and a terpene resin (B) and a second component including a polyisocyanate (C), wherein the polyol (A) includes a polybutadiene polyol (A1-1) and/or a hydrogenated polybutadiene polyol (A1-2).

<First Component>

[Polybutadiene Polyol (A1-1) and/or Hydrogenated Polybutadiene Polyol (A1-2)]

As the polyol (A) included in the first component, the polybutadiene polyol (A1-1) and/or the hydrogenated polybutadiene polyol (A1-2) (hereafter, both of them may be collectively referred to as "PB polyol (A1)") is used.

The polybutadiene polyol (A1-1) is preferably a polybutadiene polyol intramolecularly having a polybutadiene structure of the 1,4-bond type, the 1,2-bond type, or the mixture type of both and at least two hydroxyl groups, more preferably a polybutadiene polyol having hydroxyl groups at both ends of the polybutadiene structure.

The hydroxyl value of the polybutadiene polyol (A1-1) is not particularly limited and, for example, may be 10 to 200 mgKOH/g, may be 15 to 150 mgKOH/g, may be 20 to 120 mgKOH/g, may be 25 to 100 mgKOH/g, or may be 40 to 90 mgKOH/g. In this Description, the hydroxyl values are measured in accordance with the method A in JIS K1557-1:2007.

The hydrogenated polybutadiene polyol (A1-2) has a structure provided by hydrogenating the polybutadiene polyol (A1-1) and a portion of or the entirety of the unsaturated double bonds included in the polybutadiene polyol are hydrogenated. The hydrogenated polybutadiene polyol (A1-2) is not particularly limited in terms of the degree of hydrogenation and, for example, the iodine number may be 50 g/100 g or less or may be 30 g/100 g or less. In this Description, the iodine numbers are measured in accordance with JIS K0070.

The hydroxyl value of the hydrogenated polybutadiene polyol (A1-2) is not particularly limited and, for example, may be 10 to 200 mgKOH/g, may be 15 to 150 mgKOH/g, may be 20 to 120 mgKOH/g, may be 25 to 100 mgKOH/g, may be 40 to 90 mgKOH/g.

[Castor Oil-Based Polyol (A2)]

The polyol (A) may further include a castor oil-based polyol (A2). As the castor oil-based polyol (A2), polyols produced from castor oil, castor oil fatty acid, or hydrogenated castor oils or hydrogenated castor oil fatty acid prepared by hydrogenating the foregoing can be used. More specifically, examples of the castor oil-based polyol (A2) include castor oil, transesterification products between castor oil and another natural fat or oil, reaction products between castor oil and a polyhydric alcohol, esterification products between castor oil fatty acid and a polyhydric alcohol, and polyols provided by addition polymerization of alkylene oxide to the foregoing.

The hydroxyl value of the castor oil-based polyol (A2) is not particularly limited and, for example, may be 50 to 250 mgKOH/g or may be 100 to 180 mgKOH/g.

[Polyol (A)]

The polyol (A) may be composed of the PB polyol (A1) alone, may be composed of the PB polyol (A1) and the castor oil-based polyol (A2) alone, may contain the PB polyol (A1) and another polyol (A3), or may contain the PB polyol (A1), the castor oil-based polyol (A2), and another polyol (A3). The polyol (A) may be composed of a bifunctional polyol alone or may include a tri- or higher functional polyol; in a case where the polyisocyanate (C) is composed of a bifunctional polyisocyanate alone, from the viewpoint of providing a thermosetting polyurethane resin composition, a tri- or higher functional polyol is preferably included.

The other polyol (A3) is not particularly limited and examples include compounds intramolecularly having a plurality of hydroxyl groups that are various polyols other than the PB polyol (A1) and the castor oil-based polyol (A2). Specific examples include polyether polyol, polyester polyol, polycarbonatepolyol, dimer acid polyol, polycaprolactonepolyol, acrylic polyol, polyisoprenepolyol, and hydrogenated polyisoprenepolyol. The other polyol (A3) may be low-molecular-weight polyols ordinarily used as crosslinking agents such as polyhydric alcohols having a molecular weight of 300 or less; specific examples include aromatic alcohols such as N,N-bis(2-hydroxypropyl)aniline, hydroquinone-bis(β-hydroxyethyl) ether, and resorcinol-bis (β-hydroxyethyl) ether and aliphatic alcohols such as ethylene glycol, 1,4-butanediol, octanediol, trimethylolpropane, and triisopropanolamine.

The PB polyol (A1) content relative to 100 mass % of the polyol (A) is 30 mass or more, more preferably 50 mass, or more, still more preferably 60 mass % or more. The PB polyol (A1) content is 30 mass % or more, so that the adhesion to the electronic circuit board or the like can be improved and the dielectric constant can be decreased. The upper limit of the PB polyol (A1) content is not particularly limited and may be 100 mass %, may be 95 mass %, may be 85 mass %, or may be 60 mass %.

When the polyol (A) contains the castor oil-based polyol (A2), the castor oil-based polyol (A2) content relative to 100 mass % of the polyol (A) is not particularly limited and, for example, may be 5 to 70 mass %, may be 15 to 50 mass %, or may be 20 to 40 mass %.

[Terpene Resin (B)]

In this embodiment, as the first component, in addition to the PB polyol (A1), the terpene resin (B) is used. The terpene resin (B) has high compatibility with the PB polyol (A1), to thereby suppress separation or turbidity of the first component. The combined use of the PB polyol (A1) and the terpene resin (B) can improve adhesion to the electronic circuit board or the like and can provide a polyurethane resin having a low dielectric constant.

The terpene resin (B) is a polymer including terpene as a constitutional monomer. Examples of the terpene (also referred to as a terpene monomer) include monoterpenes such as α-pinene, β-pinene, limonene (also including racemic dipentene), myrcene, alloocimene, ocimene, α-phellandrene, β-phellandrene, α-terpinene, γ-terpinene, and sabinene. Of these, preferred are monocyclic monoterpenes such as α-pinene, β-pinene, limonene, α-phellandrene, β-phellandrene, α-terpinene, and γ-terpinene, and more preferred is at least one selected from the group consisting of α-pinene, β-pinene, and limonene.

Examples of the terpene resin (B) include a polyterpene resin (B1) that is a homopolymer formed from a constitutional monomer being a terpene monomer alone or a copolymer, an aromatic-modified terpene resin (B2) that is a copolymer formed from a terpene monomer and an aromatic monomer, and a terpene phenolic resin (B3) that is a copolymer formed from a terpene monomer and a phenol-based monomer. These may be used alone or in combination of two or more thereof.

For the aromatic monomer constituting the aromatic-modified terpene resin (B2) include styrene, α-methylstyrene, 4-methylstyrene, and 2,4-dimethylstyrene.

Examples of the phenol-based monomer constituting the terpene phenolic resin (B3) include phenol, cresol, and xylenol.

Preferred examples of the terpene resin (B) include the polyterpene resin (B1) that is a homopolymer or copolymer of at least one selected from the group consisting of α-pinene, β-pinene, and limonene, the aromatic-modified terpene resin (B2) that is a copolymer of at least one terpene monomer selected from the group consisting of α-pinene, β-pinene, and limonene, and styrene, and the terpene phenolic resin (B3) that is a copolymer of at least one terpene monomer selected from the group consisting of α-pinene, β-pinene, and limonene, and phenol.

The terpene resin (B) content relative to 100 parts by mass of the polyol (A) is 1 to 60 parts by mass. The terpene resin (B) content is 60 parts by mass or less, so that bleeding of the terpene resin (B) in the cured polyurethane resin can be suppressed. The terpene resin (B) content is preferably 5 parts by mass or more, more preferably 10 parts by mass or more, still more preferably 15 parts by mass or more, or preferably 50 parts by mass or less, more preferably 40 parts by mass or less, still more preferably 30 parts by mass or less.

[Other Components]

To the first component, in addition to the above-described components, as needed, various additives such as catalysts, antioxidants, foam stabilizers, diluents, flame retardants, ultraviolet absorbents, colorants, fillers, and plasticizers can be added as long as the object of this embodiment is not impaired.

Examples of the catalysts include various urethane polymerization catalysts including metallic catalysts such as organotin catalysts, organolead catalysts, and organobismuth catalysts, and amine catalysts.

<Second Component>

[Polyisocyanate (C)]

The polyisocyanate (C) included in the second component is not particularly limited and various polyisocyanate compounds including two or more isocyanate groups in a single molecule can be used. Examples of the polyisocyanate (C) include an aliphatic polyisocyanate compound (C1), an alicyclic polyisocyanate compound (C2), an aromatic polyisocyanate compound (C3), and modified compounds and poly-nuclear compounds of the foregoing; these can be used alone or in combination of two or more thereof.

Examples of the aliphatic polyisocyanate compound (C1) include tetramethylene diisocyanate, dodecamethylene diisocyanate, hexamethylene diisocyanate (HDI), 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate.

Examples of the alicyclic polyisocyanate compound (C2) include isophorone diisocyanate (IPDI), hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane.

Examples of the aromatic polyisocyanate compound (C3) include tolylene diisocyanate (TDI, for example, 2,4-TDI or 2,6-TDI), diphenylmethane diisocyanate (MDI, for example, 2,2'-MDI, 2,4'-MDI, or 4,4'-MDI), 4,4'-dibenzyl diisocyanate, 1,5-naphthylene diisocyanate, xylylene diisocyanate (XDI), 1,3-phenylene diisocyanate, and 1,4-phenylene diisocyanate.

Examples of modified compounds of the polyisocyanate compounds (C1) to (C3) include isocyanurate-modified compounds, allophanate-modified compounds, biuret-modified compounds, adduct-modified compounds, and carbodiimide-modified compounds.

In an embodiment, preferred examples of the polyisocyanate (C) include polymeric MDI, carbodiimide-modified compounds of the polyisocyanate compounds (C1) to (C3) (more preferably the carbodiimide-modified compound of the aromatic polyisocyanate compound (C3)), and isocyanurate-modified compounds of the polyisocyanate compounds (C1) to (C3) (more preferably the isocyanurate-modified compound of the aliphatic polyisocyanate compound (C1)); these may be used alone or in combination of two or more thereof. More preferably, at least one selected from the group consisting of polymeric MDI, carbodiimide-modified MDI, and isocyanurate-modified HDI is used.

The polyisocyanate (C) content in the two-component-curable polyurethane resin composition is not particularly limited and may be, for example, relative to 100 parts by mass of the polyol (A), 1 to 70 parts by mass, may be 3 to 50 parts by mass, or may be 5 to 40 parts by mass.

The polyisocyanate (C) may be composed of a bifunctional polyisocyanate alone or may include a tri- or higher functional polyisocyanate; when the polyol (A) is composed of a bifunctional polyol alone, from the viewpoint of providing a thermosetting polyurethane resin composition, a tri- or higher functional polyisocyanate is preferably included.

The ratio of the polyisocyanate (C) to the polyol (A) is not particularly limited; for example, the ratio of the number of moles of the polyisocyanate (C) to the number of moles of the polyol (A), NCO/OH (index), may be 0.6 to 1.5, may be 0.7 to 1.4, may be 0.8 to 1.3, or may be 0.9 to 1.2.

(Other Components)

The second component may be composed of the polyisocyanate (C) alone; alternatively, in addition to the polyisocyanate (C), as needed, for example, various additives such as catalysts, antioxidants, foam stabilizers, diluents, flame retardants, ultraviolet absorbents, colorants, fillers, and plasticizers can be added as long as the object of this embodiment is not impaired.

<Two-Component-Curable Polyurethane Resin Composition>

The two-component-curable polyurethane resin composition according to this embodiment is ordinarily constituted by a first liquid serving as the first component and a second liquid serving as the second component, but may include, in addition to the first component and the second component, a third liquid that is a third component including the above-described other components serving as optional components.

The two-component-curable polyurethane resin composition can be produced by individually preparing the first component and the second component; thus, the first component and the second component may be filled into separate containers. The first component and the second component filled into separate containers may be mixed together at the time of use, so that the reaction between the polyol (A) and the polyisocyanate (C) is caused to form a polyurethane resin and the polyurethane resin is cured. At this time, heating may be performed to achieve the curing. The two-component-curable polyurethane resin composition according to the embodiment may be a composition obtained by mixing together the first component and the second component, may be a liquid to be cured, or may be a cured composition.

<Polyol Composition>

A polyol composition according to an embodiment is used as the polyol component of the two-component-curable polyurethane resin composition and corresponds to the above-described first component. Thus, the polyol composition includes the polyol (A) and the terpene resin (B), wherein the polyol (A) includes 30 mass % or more of a polybutadiene polyol and/or a hydrogenated polybutadiene polyol, and the content of the terpene resin (B) relative to 100 parts by mass of the polyol (A) is 1 to 60 parts by mass. The details of the polyol (A), the terpene resin (B), and the other components are the same as those described above and will not be described again.

<Applications of Two-Component-Curable Polyurethane Resin Composition>

The two-component-curable polyurethane resin composition according to this embodiment is not particularly limited in terms of applications and is preferably used for sealing electrical or electronic components. Examples of the electrical or electronic components include transformers such as transformer coils, choking coils, and reactor coils, device control boards, sensors, and radio communication components. The two-component-curable polyurethane resin composition, which has a good low-dielectric-constant characteristic (specifically has a low dielectric constant) and is less likely to be affected by radio waves, is preferably used as a sealing material for resin-sealing, in other words, covering radio communication components for radio communications in order to protect the radio communication components from the external environments; for example, the composition may be used as a sealing material for sensors that transmit detected data by radio communications.

Electrical or electronic components resin-sealed using the two-component-curable polyurethane resin composition according to this embodiment can be applied to, for example, electric washing machines, toilet seats, water heaters, water purifiers, baths, dish washers, solar panels, machine tools, automobiles, and motorcycles.

Example 3

Hereinafter, the two-component-curable polyurethane resin composition will be described in detail on the basis of Examples and Comparative Examples, which do not limit the present invention.

The raw materials used in Examples and Comparative Examples are as follows.

[Polyol (A)]

Polybutadiene polyol 1: hydroxyl value: 47 mgKOH/g, product name: Poly bd R-45HT, manufactured by Idemitsu Kosan Co., Ltd.

Polybutadiene polyol 2: hydroxyl value: 107 mgKOH/g, product name: Poly bd R-15HT, manufactured by Idemitsu Kosan Co., Ltd.

Polybutadiene polyol 3: hydroxyl value: 49 mgKOH/g, product name: KRASOL LBH-2000, manufactured by Cray Valley Hydrogenated polybutadiene polyol: hydroxyl value: 49 mgKOH/g, product name: KRASOL H-LBH-2000, manufactured by Cray Valley Castor oil-based polyol: hydroxyl value: 120 mgKOH/g, product name: HS2G-120, manufactured by HOKOKU CORPORATION Polyether polyol: hydroxyl value: 10 mgKOH/g, product name: G-1000, manufactured by DAI-ICHI KOGYO SEIYAKU CO., LTD.

[Terpene Resin (B)]

Terpene resin 1: limonene-styrene copolymer, active component: 50 mass %, product name: YS RESIN LP, manufactured by YASUHARA CHEMICAL CO., LTD.

Terpene resin 2: pinene-dipentene copolymer, active component: 80 mass %, product name: Dimeron, manufactured by YASUHARA CHEMICAL CO., LTD.

Terpene resin 3: phenol-α-pinene copolymer, active component: 100 mass %, product name: YS POLYSTER T80, manufactured by YASUHARA CHEMICAL CO., LTD.

[Comparative Resin]

Petroleum resin: manufactured by Tosoh Corporation, product name: PETROTACK

[Catalyst]

Tin-based catalyst: product name: NEOSTANN U-810, manufactured by Nitto Kasei Co., Ltd.

[Polyisocyanate (C)]

Polyisocyanate 1: polymeric MDI, product name: Millionate MR-200, manufactured by Tosoh Corporation Polyisocyanate 2: carbodiimide-modified MDI, product name: Lupranate MM103, manufactured by BASF INOAC Polyurethanes Ltd.

Polyisocyanate 3: isocyanurate-modified HDI, product name: Duranate TPA-100, manufactured by Asahi Kasei Corporation Examples 1 to 14 and Comparative Examples 1 to 4

Two-component-curable polyurethane resin compositions of Examples and Comparative Examples were prepared in accordance with formulations (parts by mass) in Table 1 and Table 2 below. During the preparation, predetermined amounts of the first components in Table 1 and Table 2 were weighed out, stirred and mixed while being dissolved under appropriate heating, and, after the mixing, adjusted to 25° C. Subsequently, to the mixtures, the second components (polyisocyanate (C)) adjusted to 25° C. were added as described in Table 1 and Table 2, stirred and mixed, and defoamed.

The two-component-curable polyurethane resin compositions were measured and evaluated in terms of compatibility, adhesion, and dielectric constant. The measurements and evaluations were performed in the following manner.

[Compatibility]

The states of the liquids after the mixing of the first components were observed and the compatibility between the terpene resin or the comparative resin and the polyol (A) was evaluated on the basis of the following grades.

A: transparent

B: relatively turbid

C: turbid

D: separation occurred after a lapse of 30 minutes or more

E: separation occurred after a lapse of less than 30 minutes

[Adhesion]

On a commercially available FR-4 epoxy substrate, such a defoamed two-component-curable polyurethane resin composition was dropped in a circular form having a diameter of about 1 cm, and aged at 80° C. for 16 hours (overnight) to cure. From the boundary between the cured polyurethane resin and the epoxy substrate, the resin was shaven off using a cutter and the remaining polyurethane resin on the substrate was visually observed. The evaluation was performed in the following manner: cohesive failure was defined as a state in which the polyurethane resin portion remains on the substrate; interfacial delamination was defined as a state in which the polyurethane resin has been peeled off from the substrate; mixtures of both of the states were evaluated in accordance with the area ratios on the basis of the following grades.

A: 100% of cohesive failure

B: 75% or more and less than 100% of cohesive failure and more than 0% and 25% or less of interfacial delamination C: 50% or more and less than 75% of cohesive failure and more than 25% and 50% or less of interfacial delamination D: 25% or more and less than 50% of cohesive failure and more than 50% and 75% or less of interfacial delamination E: less than 25% of cohesive failure and 75% or more of interfacial delamination

[Dielectric Constant]

The defoamed two-component-curable polyurethane resin composition was cast into a mold having a thickness of 3 mm and aged at 80° C. for 16 hours (overnight), to produce a resin sheet having a thickness of 3 mm. The resin sheet was cut into sheets of 50 mm×50 mm×3 mm, which were used as measurement samples. The measurement was performed using an apparatus manufactured by Agilent Technologies, Inc. (model of body: E4930A, name: Precision LCP Meter, model of electrode part: 16451B, name: DIELECTRIC TEST FIXTURE); the value of the dielectric constant (relative dielectric constant) at a frequency of 1 MHz was measured.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| First component | Formulation (parts by mass) | | | | | | | | | |
| | Polybutadiene polyol 1 | 70 | 90 | 60 | | | | 70 | 70 | 60 |
| | Polybutadiene polyol 2 | | | | 70 | | | | | |
| | Polybutadiene polyol 3 | | | | | 70 | | | | |
| | Hydrogenated polybutadiene polyol | | | | | | 70 | | | |
| | Castor oil-based polyol | | | | | | | | | 20 |
| | Polyether polyol | | | | | | | | | |
| | Terpene resin 1 | 30 | 10 | 40 | 30 | 30 | 30 | | | 20 |
| | Terpene resin 2 | | | | | | | 30 | | |
| | Terpene resin 3 | | | | | | | | 30 | |
| | Comparative resin | | | | | | | | | |
| | Catalyst | | | | | | | | | |
| | Total | 100 | 100 | 100 | 100 | 100 | 100 | 100 | 100 | 100 |
| | Parts by mass of terpene resin relative to 100 parts by mass of polyol | 21.4 | 5.6 | 33.3 | 21.4 | 21.4 | 21.4 | 34.2 | 42.8 | 12.5 |
| | Mass % of PB polyol (A) relative to 100 mass % of polyol | 100 | 100 | 100 | 100 | 100 | 100 | 100 | 100 | 75 |
| Second component | Formulation (parts by mass) | | | | | | | | | |
| | Polyisocyanate 1 | | 10 | 6 | 15 | 9 | 9 | 8.5 | | 13 |
| | Polyisocyanate 2 | | | | | | | | | |
| | Polyisocyanate 3 | | | | | | | | | |
| | NCO/OH (index) | 0.88 | 0.98 | 0.88 | 0.83 | 1.09 | 1.09 | 1.07 | 1.01 | 1.03 |
| Evaluation | Compatibility | A | A | A | A | A | A | A | A | A |
| | Adhesion | A | B | A | B | B | B | A | A | B |
| | Dielectric constant | 2.6 | 2.8 | 2.6 | 2.8 | 2.7 | 2.6 | 2.7 | 2.7 | 2.6 |

TABLE 2

| | | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|
| First component | Formulation (parts by mass) | | | | | | | | | |
| | Polybutadiene polyol 1 | 50 | 40 | 50 | 70 | 70 | 70 | 100 | | 20 |
| | Polybutadiene polyol 2 | | | | | | | | | |
| | Polybutadiene polyol 3 | | | | | | | | | |
| | Hydrogenated polybutadiene polyol | | | | | | | | | |
| | Castor oil-based polyol | 20 | 20 | 20 | | | | | | 50 |
| | Polyether polyol | | | | | | | | 70 | |
| | Terpene resin 1 | 30 | 40 | | 30 | 30 | | | 30 | 30 |
| | Terpene resin 2 | | | | | | | | | |
| | Terpene resin 3 | | | 30 | | | | | | |
| | Comparative resin | | | | | | 30 | | | |
| | Catalyst | | | | | 0.0001 | | | | |
| | Total | 100 | 100 | 100 | 100 | 100 | 100 | 100 | 100 | 100 |
| | Parts by mass of terpene resin relative to 100 parts by mass of polyol | 21.4 | 33.3 | 42.8 | 21.4 | 21.4 | 0 | 0 | 21.4 | 21.4 |
| | Mass % of PB polyol (A) relative to 100 mass % of polyol | 71 | 67 | 7 | 100 | 100 | 100 | 100 | 0 | 29 |
| Second component | Formulation (parts by mass) | | | | | | | | | |
| | Polyisocyanate 1 | 12 | 11 | 14 | | | 9 | | 24 | 16 |
| | Polyisocyanate 2 | | | | 8 | | | 11 | | |
| | Polyisocyanate 3 | | | | | 11 | | | | |
| | NCO/OH (index) | 1.05 | 1.06 | 1.22 | 0.96 | 1.03 | 1.13 | 0.92 | 0.89 | 0.95 |
| Evaluation | Compatibility | A | A | A | A | A | D | A | E | A |
| | Adhesion | A | A | A | A | B | — | D | — | D |
| | Dielectric constant | 2.7 | 2.7 | 2.7 | 2.6 | 2.7 | — | 2.8 | — | 3 |

The results are described in Table 1 and Table 2. In Comparative Example 1 using not a terpene resin but a petroleum resin, poor compatibility with the polybutadiene polyol resulted in separation of the first component, so that evaluations of adhesion and dielectric constant were not performed. In Comparative Example 2 not including resins, the adhesion to the substrate was poor. In Comparative Example 3 using, instead of the polybutadiene polyol, the polyether polyol, poor compatibility between the polyether polyol and the terpene resin resulted in separation of the first component, so that evaluations of adhesion and dielectric constant were not performed. On the other hand, in Comparative Example 4 in which a polybutadiene polyol and a terpene resin were used in combination, the ratio of the polybutadiene polyol relative to the polyol is low and the adhesion was poor, and the dielectric constant was higher than that of Comparative Example 2. By contrast, in Examples 1 to 14, the compatibility between the polyol and the terpene resin was high and, compared with Comparative Example 2, a low-dielectric-constant characteristic was maintained, but the adhesion to the substrate was high.

Some embodiments according to the present invention have been described so far; however, these embodiments are provided as examples and are not intended to limit the scope of the invention. These embodiments can also be carried out in various other forms and various omissions, replacements, and changes can be performed without departing from the spirit and scope of the invention. These embodiments and their omissions, replacements, changes, and the like are included in the scope and spirit of the invention and similarly included in the invention described in Claims and the range of equivalents.

The invention claimed is:

1. A two-component-curable polyurethane resin composition comprising:

a first component including a polyol and a terpene resin; and a second component including a polyisocyanate, wherein the polyol includes 60 mass % or more of a polybutadiene polyol and/or a hydrogenated polybutadiene polyol, wherein a content of the terpene resin relative to 100 parts by mass of the polyol is 5-50 parts by mass, and wherein the terpene resin is at least one selected from the group consisting of a polyterpene resin, an aromatic-modified terpene resin, and a terpene phenolic resin.

2. The two-component-curable polyurethane resin composition according to claim 1, wherein the polyol further includes a castor oil-based polyol.

3. The two-component-curable polyurethane resin composition according to claim 1, being used for sealing an electrical or electronic component.

4. An electrical or electronic component being resin-sealed using the two-component-curable polyurethane resin composition according to claim 1.

5. A polyol composition used as a polyol component of a two-component-curable polyurethane resin composition, the polyol composition comprising:

a polyol and a terpene resin, wherein the polyol includes 60 mass % or more of a polybutadiene polyol and/or a hydrogenated polybutadiene polyol, wherein a content of the terpene resin relative to 100 parts by mass of the polyol is 5 to 55 parts by mass, and wherein the terpene resin is at least one selected from the group consisting of a polyterpene resin, an aromatic-modified terpene resin, and a terpene phenolic resin.

* * * * *